US009811837B2

(12) United States Patent
Groarke

(10) Patent No.: US 9,811,837 B2
(45) Date of Patent: Nov. 7, 2017

(54) SYSTEM AND METHOD FOR SETTING A PRODUCT WATCH ON TRANSACTION DATA

(75) Inventor: Peter Groarke, Dublin (IE)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 1094 days.

(21) Appl. No.: 13/537,737

(22) Filed: Jun. 29, 2012

(65) Prior Publication Data
US 2014/0006209 A1 Jan. 2, 2014

(51) Int. Cl.
G06Q 30/06 (2012.01)
G06Q 30/02 (2012.01)
G06Q 40/02 (2012.01)
G06Q 30/08 (2012.01)

(52) U.S. Cl.
CPC ......... *G06Q 30/0201* (2013.01); *G06Q 40/02* (2013.01)

(58) Field of Classification Search
CPC ............................... G06Q 30/06; G06Q 30/08
USPC ................................................. 705/26.1, 27.1
See application file for complete search history.

(56) References Cited

U.S. PATENT DOCUMENTS

| 7,257,581 | B1 | 8/2007 | Steele et al. |
| 8,032,765 | B2 | 10/2011 | Dettinger et al. |
| 8,037,471 | B2 | 10/2011 | Keller et al. |
| 8,311,944 | B2 | 11/2012 | Knowles et al. |
| 2001/0043599 | A1 | 11/2001 | Redmond |
| 2003/0163483 | A1 | 8/2003 | Zingher et al. |
| 2006/0247824 | A1* | 11/2006 | Walker ................. G06Q 20/02 700/241 |
| 2007/0192229 | A1 | 8/2007 | Rowan |
| 2009/0119209 | A1 | 5/2009 | Sorensen et al. |
| 2009/0287536 | A1 | 11/2009 | Sheng |
| 2010/0076813 | A1 | 3/2010 | Ghosh et al. |
| 2010/0114790 | A1* | 5/2010 | Strimling et al. ............. 705/330 |
| 2011/0125393 | A1 | 5/2011 | Williams et al. |
| 2012/0036042 | A1 | 2/2012 | Graylin et al. |

(Continued)

OTHER PUBLICATIONS

"Benefits of Open Payment Systems and the Role of Interchange", MasterCard Worldwide, U.S. Version, 2008, pp. 1-12.

(Continued)

*Primary Examiner* — James Zurita
(74) *Attorney, Agent, or Firm* — Ohlandt, Greeley, Ruggiero & Perle, L.L.P.

(57) ABSTRACT

A system and a method for determining at least one of availability and price of a product includes an electronic storage device having a database of merchant transactions stored therein; an access path for allowing access to information concerning the transactions, including when a given product has been sold and the price at which the product was sold, and a processor for assembling the information concerning at least one of sales of the given product and the price at which it was sold, to provide at least one of locations where the product is available, and the price at which the product was sold at the location or locations. A computer readable non-transitory storage medium stores instructions of a computer program which, when executed by a computer system, results in performance of steps of the method for determining at least one of availability and price of a product.

24 Claims, 3 Drawing Sheets

(56) References Cited

U.S. PATENT DOCUMENTS

2012/0150742 A1   6/2012   Poon et al.
2012/0185368 A1   7/2012   Schloter et al.

OTHER PUBLICATIONS

Christian von Weizsacker, "Economics of Credit Cards—Expert Report on behalf of MasterCard International Incorporated and Europay International SA", Jan. 23, 2002, pp. 1-29.
John Bulmer, "Payment Systems: The Credit Card Market in Canada", Library Bibliothèque of Parliament du Parlement, Sep. 24, 2009, pp. 1-8.
U.S. Appl. No. 13/538,226, filed Jun. 29, 2012.
U.S. Appl. No. 13/538,270, filed Jun. 29, 2012.
U.S. Appl. No. 13/538,305, filed Jun. 29, 2012.
U.S. Appl. No. 13/564,321, filed Aug. 1, 2012.
U.S. Appl. No. 13/564,370, filed Aug. 1, 2012.
U.S. Appl. No. 13/564,398, filed Aug. 1, 2012.
U.S. Appl. No. 13/655,008, filed Oct. 18, 2012.
"PCI DSS Quick Reference Guide Understanding the Payment Card Industry Data Security Standard version 2.0 ", PCI Security Standards Council, LLC, Oct. 2010, pp. 34.

\* cited by examiner

SYSTEM AND METHOD FOR SETTING A PRODUCT WATCH ON TRANSACTION DATA

BACKGROUND OF THE DISCLOSURE

1. Field of the Disclosure

The present disclosure relates to payment card systems. More particularly, it relates to methods for exploiting the information generated by the transactions conducted on such systems.

2. Description of the Related Art

The first credit payment systems were two party systems in which a merchant sold goods to a customer without requiring full or any initial payment, but where the customer paid for the goods at a later date, or may have made periodic payments over a predetermined period of time. This method of payment is of limited scope and is not flexible, in that it involves only one merchant, and the customer must make individual arrangements with each and every merchant, and for each and every transaction.

In a three party system, a single card issuer contracts with customers and issues credit cards to them. The issuer also contracts with merchants, who agree to make sales to customer having a credit card from the issuer. When a card is presented at a merchant's establishment, it is generally the issuer who approves the transaction and pays the merchant. However, this system, a so-called closed system, has occasionally been modified so that another party approves the transaction and interacts with the merchant.

MasterCard, the assignee of the present application, operates within what is known as a "four-party" payment card system. The four key participants in a four-party system are: (i) the consumer and business cardholders that use the cards; (ii) the merchants that accept the cards; (iii) the financial institutions that issue the cards (referred to as the card issuer); and (iv) the financial institutions that sign up merchants to accept the cards (referred to as the acquirer). In a typical four-party payment card transaction, the merchant pays a "merchant discount fee" (i.e., a merchant service charge) to the acquirer in recognition of the services provided by the acquirer in facilitating payment card acceptance by the merchant. However, a substantial portion of the benefits that the merchant receives through card acceptance comes from the value of the network and services performed by the card issuer. For example, the card issuer underwrites and extends credit to the cardholder of a credit card, which enables the sale, and the card issuer assumes the risk of nonpayment by the cardholder, which enables the merchant to get paid for the transaction even if card issuer does not. To compensate the card issuer for providing such benefits to the acquirer's merchant customer, the acquirer pays an "interchange fee" to the card issuer in connection with a payment card transaction. The interchange fee helps to partially reimburse the card issuer for the many activities it performs and costs it incurs that enable the acquirer to provide significant benefits and value to its merchant customers. Interchange fees are only one of the many cost components of the merchant discount fees that are established by acquirers and paid by merchants in exchange for card acceptance services provided by acquirers to merchants.

In general, the transaction system and associated methods described above work. However there are situations in which additional convenience for the user would be desirable.

SUMMARY OF THE DISCLOSURE

Disclosed herein is a method (and a system) for determining at least one of availability and price of a product, comprising storing in an electronic storage device a database of merchant transactions; accessing information in the database concerning the transactions, including when a given product has been sold and the price at which the product was sold, and assembling the information to provide at least one of sales of the given product and the price at which it was sold, to provide at least one of locations where the product is available, and the price at which the product was sold at that location. Using the access path, the customer can enter transaction rules for making an inquiry in the database concerning at least one of availability and price of a product. The method can be used in a three or four party payment card processing system.

The database can contain data concerning transactions in a given geographic region. It can be filtered to remove cardholder information related to the transactions. The data can be accessed using a web site and an Internet connected device for connecting to the web site. The Internet connected device that is used can be one of a mobile telephone, a computer, a tablet and a personal digital assistant, including an iPad®. An application that causes the Internet connected device to access the data in the database via the web site, can be used. At least one of a GPS receiver and a location input screen, on the Internet connected device, can be used to provide a location of the Internet connected device.

Information concerning merchant establishments that are currently open for business can be shown on a display screen of the Internet connected device. The information can be displayed on the screen as a list of merchants that are selling the product currently, and their contact information. This may be in the form a real time map indicating location of merchant establishments that are selling the product currently, and the price at which the product is being sold. The locations of merchant establishments can be displayed as markers on the map.

When data in the database indicates that a merchant is no longer selling the product, or the product is being offered at a price higher than a requested price, a marker corresponding to the merchant can be changed as a warning.

The disclosure is also directed to a computer readable non-transitory storage medium storing instructions of a computer program which when executed by a computer system result in performance of steps of the method described for determining at least one of availability and price of a product.

BRIEF DESCRIPTION OF THE DRAWINGS

A component or a feature that is common to more than one drawing is indicated with the same reference number in each of the drawings.

DESCRIPTION OF THE EMBODIMENT

One problem associated with the use of payment cards is that potential customers may be interested in a particular product, which is out of stock in a given geographic area. Alternatively, a customer may be seeking a specific item, but the price at which the item is currently being offered may not be low enough for the customer to make the purchase.

Reviewing authorization transaction data and merchant location data resulting from transactions can provide an indicator of at least one of when and where a particular item becomes available in a given area, and whether it is available at the desired price. Transaction rules can be set to monitor transaction data to achieve this result. A perspective customer can receive an alert of the merchant location, availability of the desired item, and the price at which it is being sold.

Figure 1:
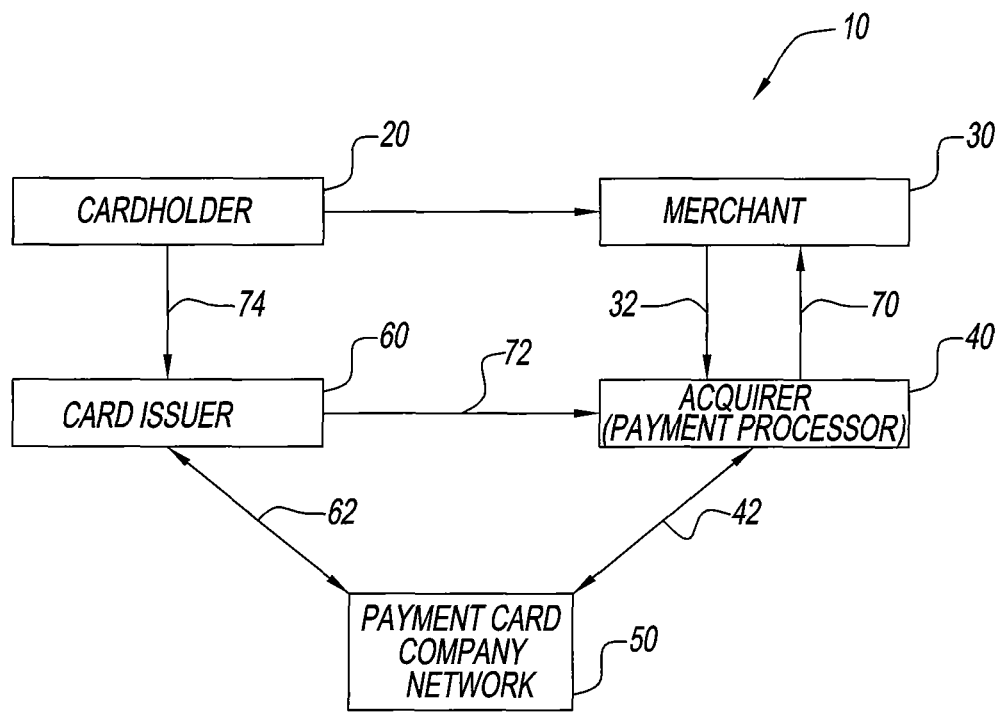
FIG. 1 is a diagram of a four party payment card system.

Referring to the drawings and, in particular, FIG. 1, there is shown a four party system 10. The cardholder 20 submits the payment card to the merchant 30. The merchant's point of sale device (80 in FIG. 2) communicates 32 with his acquiring bank or acquirer 40, which acts as a payment processor. The acquirer 40, at 42, initiates the transaction on the payment card network 50. The payment card network 50 routes the transaction to the issuing bank or card issuer 60, which is identified using information in the transaction message, more fully described below. The card issuer 60 approves or denies an authorization request. At 62, the card issuer 60, then routes, via the payment card network 50 an authorization response back to the acquirer 40. The acquirer 40 sends approval to the POS device of the merchant 30. Seconds later the cardholder completes the purchase and receives a receipt.

The account of the merchant 40 is credited at 70 by the acquirer 40. The card issuer 60 pays the acquirer at 72. Eventually, at 74, the cardholder 20 pays the card issuer 60.

Figure 2:
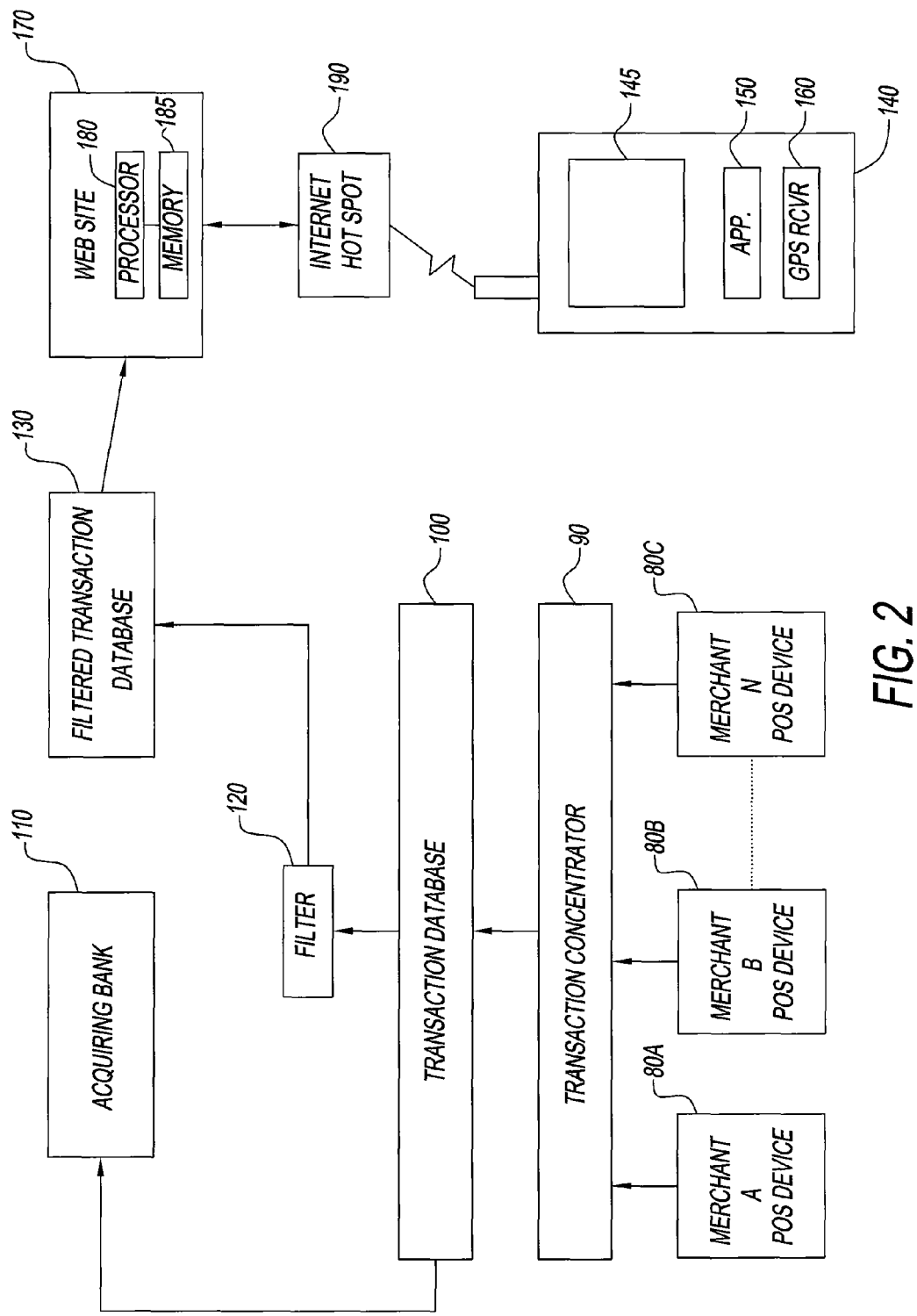
FIG. 2 is a block diagram of a portion of a payment card system modified in accordance with one aspect of the present disclosure.

Referring to FIG. 2, each merchant has on their premises at least one card swiping machine or point of sale device 80, of a type well known in the art, for initiating customer transactions. These point of sale devices 80A, 80B, . . . 80N, generally also have keyboard data entry pads for entering data when a card's magnetic coding becomes difficult to read, or for the purpose of entering card data resulting from telephone calls during which the customer provides card data by telephone. Point of sale devices 80A, 80B, . . . 80N are connected by a suitable network to a transaction concentrator 90, for a given geographic area, which concentrates the transaction information. Each concentrator 90 has associated with it a transaction database 100 that stores information concerning the transaction. Information from the concentrator 90 is routed to a respective acquiring bank 110 that, in turn, routes the information so that transactions are properly completed using the system illustrated in FIG. 1.

While it is advantageous to maintain a local database including transactions in a given geographic area, there is no such limitation on various embodiments of the present disclosure. For example, if the present disclosure is used with a three party system, data for a relatively large geographic region may be stored in a single database at a central location. The time to search this more extensive database, and provide a response to a user, may be slightly greater, but the user will obtain the same useful information. If the product is to be ordered via the Internet, then it is advantageous to provide information on a much broader geographic basis, including national or international information. However, the customer will need to take into account shipping costs for national product availability, and shipping and currency translation costs, and associated fees, for international transactions.

Information that is exchanged across the network for each credit or debit card financial transaction message includes the following characteristics: acquirer identifier/card accepter identifier (the combination of which uniquely defines the merchant); merchant address (i.e., full address and or GPS data); merchant category code (also known as card acceptor business code), that is an indication of the type of business the merchant is involved in (for example, a gas station); local transaction date and time, cardholder base currency (i.e., U.S. Dollars, Euro, Yen, etc.), the transaction environment or method being used to conduct the transaction (as more fully explained below), product specific data such as SKU line item data, and cost of the transaction.

While merchant address information in the transaction may be incomplete, it can be combined with a database of merchant identifications and precise merchant location information, such as the full address and/or GPS coordinates data for the location of the merchant. The information can be graphically displayed, as more fully described below.

Transaction records stored in transaction database 100 contain information which is highly confidential and must be maintained as such to prevent fraud and identity theft. The transaction records stored in transaction database 100 are sent through a filter 120 (FIG. 3) which removes confidential information, but retains records concerning merchant identification and the occurrence of transactions at various times; preferably in real time. The filtered data is stored in a filtered transaction database 130 which may be accessed as described below. The data of the database may be stored in any type of memory, including a hard drive, a flash memory, on a CD, in a RAM, or any other suitable memory.

The following example of an approach to accessing the data involves a mobile telephone. However, it will be understood that that there are various other approaches, technologies and pathways that can be used. These include various types of alerts such as telephone calls, text messages, instant messages and e-mails. However, for speed of response, a so called "push" technology should be used, where information is "pushed" out to the user, rather than waiting until the user decides to again check for messages.

A mobile telephone 140, having a display 145, may have a series of applications or applets thereon including an applet or application program (hereinafter an application) 150 for use with the embodiment described herein. Mobile telephone 140 may also be equipped with a GPS receiver 160 so that its position is always known. Alternatively, if no GPS receiver is provided, application 150 may have provisions for entering the current location of the mobile telephone 140, such as for example the name of the town, or the streets forming an intersection where the mobile telephone 140 is located.

Mobile telephone 140 may be used to access a website 170 on the Internet, via an Internet connected Wi-Fi hot spot 190 (or by any telephone network, such as a 3G or 4G system, on which mobile telephone 140 communicates), by using application 150. Website 170 is linked to database 130 so that authorized users of website 170 may have access to the data contained therein. The manner in which that access is exploited, in accordance with the present disclosure, is described with respect to FIG. 4.

Web site 170 has a processor 180 for assembling data from filtered transaction database 130 for responding to user inquiries, as more fully discussed below with respect to FIG. 4. A memory 185 associated with web site 170, having a non-transitory computer readable medium, stores computer readable instructions for use by processor 180 in implementing the operation of the disclosed embodiment.

While the system and method described herein are preferably used with a mobile device, because, in general, it may advantageously serve individuals who are away from a home or business location, and would like to receive "pushed" messages, it will be understood that web site 170 may be accessed from a home or business computer, including a desk top, lap top, or notebook computer, from a personal digital assistant, or any other Internet connected device, such as a tablet (for example, a device such as an i-Pad). It may suddenly occur to an individual that an important day, such as Christmas, is only a few days away, and it is necessary to do some on-line shopping almost immediately, or it is necessary to go to a local store to buy a product, if gifts are to arrive, or be obtained in person, before then.

Figure 3:
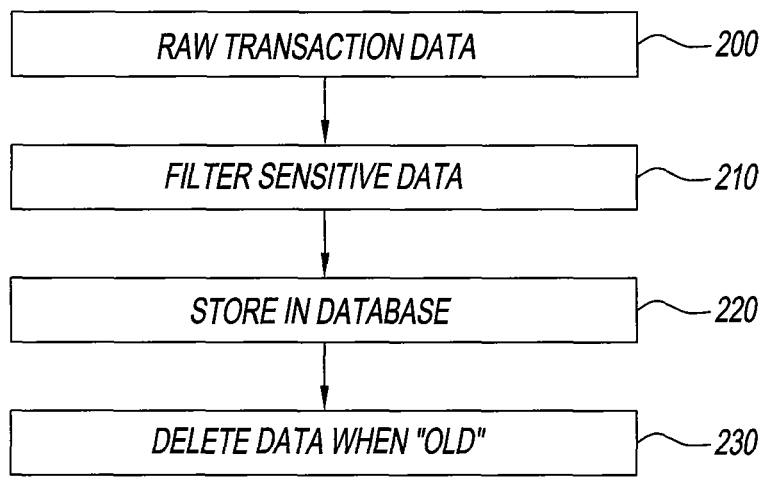
FIG. 3 is a flow chart representing the manner in which acquired data is filtered to preserve confidentiality.

Referring to FIG. 3, the operation of filter 120 (FIG. 2) is illustrated. The raw transaction data usually exchanged over the network is acquired at 200. At 210, customer sensitive information such as the credit card number and expiration date and other customer sensitive information is removed. At 220, the remaining data is stored in database 130 (FIG. 2). At 230, after a relatively short time, data which is no longer current or has become "old" in the context of the present embodiment, can be removed from the database. This serves to conserve space in the memory associated with database 130 and is permissible because, in general, transaction data which is more than, for example, in some cases, several hours or several days, old will not be helpful in indicating whether a particular merchant is still selling the product, or is selling the product at a particular price. Further, if the transaction data indicates that the product has not been sold for some time, the merchant establishment may be out of stock. In addition, if one or more sales have taken place at a price that is higher than the requested price, it is possible that the reduced price may have been a short term promotion by the merchant, and that the price has returned to its normal level.

Figure 4:
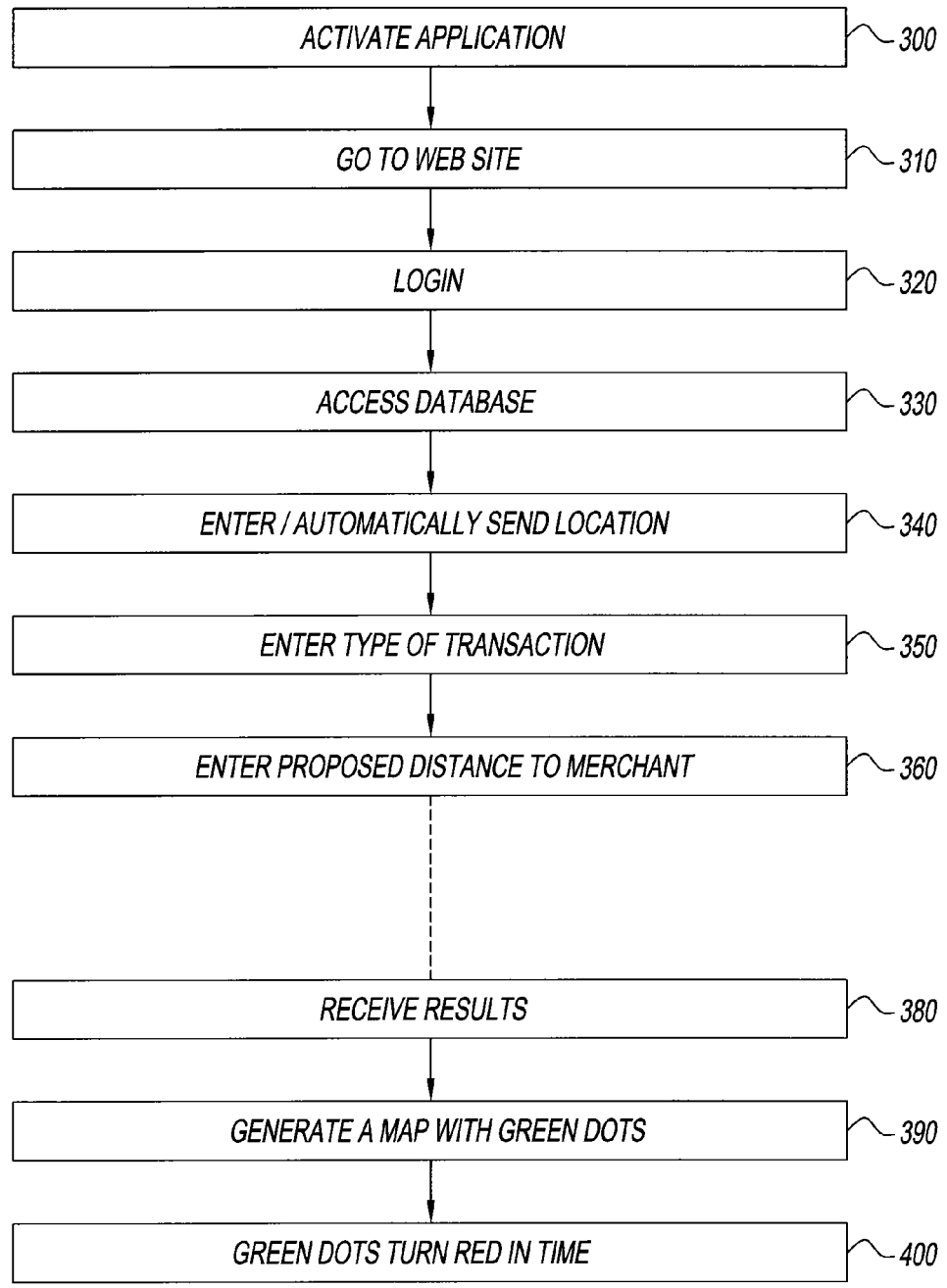
FIG. 4 is a flow chart illustrating the manner in which the system in accordance with the present disclosure is used.

FIG. 4 illustrates the manner in which the present method or system is used by a customer. At 300, the user activates application 150 on mobile telephone 140 (FIG. 2). Assuming that Internet access is available, at 310, optionally, the user will be directed to a log-in page of website 170 (FIG. 2). At 320, the user logs in with a user identification and password in a conventional manner, well known in the art. At 330, access is granted to the information in database 130

The manner in which the owner of web site 170 exploits the present method and system can vary. The web site may be available free to the public. Alternatively, a user fee may be charged, on a time of use, or periodic basis (such as monthly). Web site 170 may be made available only to card-holders of the type of card being used to make those transactions, or only for free to such cardholders. There are other possibilities for providing access to the web site.

At 340, information which is relevant to the location specified by the coordinates obtained from the GPS receiver 160 in mobile telephone 140 or the entered location information, a predefined default location, or some other method of determining location, whether now know or later developed, can be sent from the mobile telephone 140 to the web site 170. This information is especially important if the product is to be picked up at a local merchant establishment, and is less important if an Internet based purchase is being made.

At 350, using mobile telephone 140, the user enters the transaction rule desired. For example, it may be December 10, and a parent wishes to purchase for her daughter a "Malibu Barbie" doll for Christmas. However the item is in demand and all the stores in a given geographic area, for example Manhattan, N.Y., are currently out of stock. The customer can set a transaction rule as follows:

Merchant Address=New York, N.Y.; SKU data=that for "Malibu Barbie"; Transaction date-time≤23:59:59 23 Dec. 2012.

In another example, a customer in Tennessee is interested in paying a maximum of $150 for a specific model of electric lawnmower, but the local stores are only retailing the item at $200 or more. The customer may set a transaction rule as follows:

Merchant address=Tennessee; SKU data must include that for "EL-12 electric lawnmower"; transaction amount≤$150.

Attempts are made to match any new transaction data since the last time the match was run against filtered transaction database 130. The rules can be run at configurable periods such as, for example, every day or every hour. In the event of a match, the customer who set up the transaction rules will be notified in one of the ways the customer specified, as described above (for example, SMS or e-mail) with the name and location details of the merchant, including, for Internet transactions, the URL of the merchant's website.

Optionally, at 360 the user may enter the maximum distance that the user desires to travel to arrive at a place where the type of transaction entered at 350 can be conducted. If the user skips this step, a default distance of, for example three miles (4.8 kilometers), may be used. For internet purchases, the word "Internet" may be entered, thus providing results on a national or international basis.

At 380, the user will receive the results of a search in database 130 specific to the selected geographic area, for the type of transaction desired, and if price is a criteria, at the specified price, or lower. As noted above, this information may be "pushed" out to the potential customer, and may not arrive for some time. The lack of a connection between 360 and 380 is representative of this potential time delay. However, in some cases, the data may be available almost immediately. The data may be in the form of a list of establishments for conducting the desired transaction, and their addresses and telephone numbers, shown on display 145 of mobile telephone 140. Alternatively, a map may be generated with, for example, green dots indicating the location of merchants having the item in stock. Application 150 may be configured so that if one of these locations on a map is selected by, for example, using a cursor, the exact name and address for that business establishment is provided, as well as the price at which the item was sold.

When a match is run, but a sale has not taken place for some time, at the requested price, or the item is currently being sold at a higher price, the green dots generated on the previous visual or map display may be changed to red, thus indicating that the desired item may no longer be available, or that the price may have been increased.

Thus, it is clear that the embodiments of the invention described herein benefits customers, as they are proactively given timely information on the availability of items in a specific geographic area, or in an entire geographic region. The system benefits retailers because potential customers are proactively informed of the availability of particular items, thus increasing sales. The retailer also avoids the difficulties, including at least the time and expense, associated with having to provide updates to customers as items become available.

It will be understood that while the present invention has been described primarily with respect to the four party credit card system, it can also be applied, as noted above, to a three party credit card system. Further, with suitable modifications, as will be understood by one skilled in the art, it can be applied to other kinds of payment card systems, such as debit card charging systems.

While most of the discussion above applies to credit card transactions, generally the same networks that are used to process credit card transactions also can be used to process debit cards and prepaid or preloaded payment cards. Point of sale devices such as those of FIG. 1, as well as gasoline pumps, and other places where a product may be sold, are equipped with input devices, such as push buttons or touch sensitive regions, which are used to indicate whether a payment card is a credit card or a debit card, or in some cases, some other type of payment card. While the legal rules for these different types of payments vary, they are processed in very similar ways at the point of sale.

One significant way in which debit cards depart from credit cards is the processing required to settle a transaction. While transaction concentrators can be used, the acquiring bank receives payment directly from the account of a cardholder, usually at another bank. Generally all of the funds required for the transaction must be on deposit in the account tied to the debit card, before the transaction will be approved. However, some banks have permitted transactions to be conducted involving more funds than are on deposit.

Settlement is similar for prepaid or preloaded cards. An account is established at a financial institution containing a predetermined amount of funds. When the card is presented for payment, funds are withdrawn from the account in an amount sufficient to cover the transaction. Purchases wherein an attempt is made to use more money than is in the account will not be approved.

In all of these cases, the record of transaction contains virtually the same information as discussed above. Thus, the operation of the disclosed embodiment may be essentially identical to what is disclosed with respect to FIG. 2.

It will be understood that the invention may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A system comprising:
   an electronic storage device having a database of merchant transaction records that includes confidential customer sensitive information stored therein and a filtered transaction database including filtered merchant transaction data from which confidential customer sensitive information is removed, the filtered merchant transaction data including a product transaction time and a product transaction price for each transaction, the system being configured to identify filtered transaction data as no longer current after a predetermined amount of time;
   a filter configured to remove the confidential customer sensitive information from the merchant transaction data and store the filtered merchant transaction data in the filtered transaction database;
   an internet connected access interface configured to provide a user with direct access to the filtered transaction database for filtered merchant transaction data, and
   a processor and a storage medium including program instructions embodied in a non-transitory memory configured to search and assemble the filtered merchant transaction data from the filtered transaction database and to provide at least one location where at least one identified product is available, and a price at which the at least one identified product was sold at that location, wherein the processor is configured to execute the program instructions to at least:
   receive, via the access interface, a location of the user,
   receive, via the access interface, a transaction rule, wherein the transaction rule identifies parameters of a product watch,
   receive, via the access interface, a specified notification preference for providing match results of the product watch to the user;
   access and search the filtered transaction database, wherein the database comprises the filtered merchant transaction data;
   compare the parameters of the product watch identified by the transaction rule to the filtered transaction data,
   identify matches resulting from the comparison of the transaction rule to the filtered merchant transaction data, and
   provide the identified matches to the user according to the specified notification preference, wherein the identified matches include at least one location where the product was available and the price at which the product was sold at that location.

2. The system according to claim 1, wherein the location of the user is received by a method selected from the group consisting of received GPS coordinates, location information provided by the user, and any combination of same.

3. The system according to claim 1, wherein the transaction rule parameter is selected from the group consisting of a price requirement, a price range requirement, user location information, product identification information, merchant location information, a geographically selected maximum user travel distance, a default user distance, a transaction time deadline, and any combination of same.

4. The system according to claim 1, wherein the specified method for providing results of the product watch is selected from the group consisting of telephone calls, text messages, instant messages and e-mails, SMS messages, and any combination of same.

5. The system according to claim 4, wherein the results of the product watch are pushed out to the user.

6. The system according to claim 1, wherein the confidential customer sensitive information that the filter is configured to remove includes a credit card number and an expiration date.

7. The system according to claim 1, wherein the identified matches are provided to the user as displayed information selected from the group consisting of a list of merchant names, a list of merchant addresses, a list of merchant telephone numbers, a map indicating the location of merchants, a price at which the product was sold by merchants, and any combination of same.

8. The system according to claim 1, wherein the system is configured to remove filtered transaction data from the filtered transaction database after the predetermined amount of time to conserve memory in the filtered transaction database.

9. A method for determining at least one of availability and price of a product, comprising:
  storing in an electronic storage device a database of merchant transactions;
  removing the confidential customer sensitive information from the merchant transaction data with a filter;
  storing the filtered merchant transaction data in a filtered transaction database;
  identifying filtered transaction data as no longer current after a predetermined amount of time;
  receiving, via an access interface, a location of a user;
  receiving, via an access interface, a transaction rule from the user, wherein the transaction rule identifies a parameter of a product watch;
  receiving, via an access interface a specified notification preference for providing results of the product watch to the user;
  accessing and searching the filtered merchant transaction data in the filtered transaction database, the filtered merchant transaction data, the filtered merchant transaction data including a product transaction time and a product transaction price for each transaction;
  comparing the parameters of the product watch identified by the transaction rule to the transaction data;
  identifying matches resulting from the comparison of the transaction rule to the filtered merchant transaction data; and
  assembling the filtered merchant transaction data from the filtered transaction database to provide the identified matches with the at least one product transaction time and the at least one product transaction price for each transaction, to provide at least one location where the product was available, and the price at which the product was sold at that location.

10. The method according to claim 9, wherein the location of the user is received by a method selected from the group consisting of received GPS coordinates, location information provided by the user, and any combination of the foregoing.

11. The method according to claim 9, wherein the transaction rule parameter is selected from the group consisting of a price requirement, a price range requirement, user location information, product identification information, merchant location information, a geographically selected maximum user travel distance, a default user travel distance, a transaction time deadline, a SKU line item, and any combinations of same.

12. The method according to claim 9, wherein the specified method for providing results of the product watch is selected from the group consisting of telephone calls, text messages, instant messages, e-mails, SMS messages, and any combinations of same.

13. The method according to claim 12, wherein the results of the product watch are pushed out to the user.

14. The method according to claim 9, wherein the confidential customer sensitive information that the filter is configured to remove includes a credit card number and an expiration date.

15. The method according to claim 9, wherein the identified matches are provided to the user as displayed information selected from the group consisting of a list of merchant names, a list of merchant addresses, a list of merchant telephone numbers, a map indicating the location of merchants, a price at which the product was sold by merchants, and any combinations of same.

16. The method according to claim 9, further comprising:
  removing filtered transaction data from the filtered transaction database after the predetermined amount of time to conserve memory in the filtered transaction database.

17. A computer readable non-transitory storage medium storing instructions of a computer program which when executed by a computer system results in performance of steps of a method for determining at least one of availability and price of a product, comprising:
  storing in an electronic storage device a database of merchant transactions;
  executing a filter to remove the confidential customer sensitive information from the merchant transaction data;
  storing the filtered merchant transaction data in a filtered transaction database;
  identifying filtered transaction data as no longer current after a predetermined amount of time;
  receiving, via an access interface, a location of a user;
  receiving, via an access interface, a transaction rule from the user, wherein the transaction rule identifies a parameter of a product watch;
  receiving, via an access interface, a specified notification preference for providing results of the product watch to the user;
  accessing and searching the filtered merchant transaction data in the filtered transaction database, the filtered merchant transaction data including a product transaction time and a product transaction price for each transaction;
  comparing the parameters of the product watch identified by the transaction rule to the filtered merchant transaction data;
  identifying matches resulting from the comparison of the transaction rule to the filtered transaction data; and
  assembling the filtered merchant transaction data from the filtered transaction database to provide the identified matches with the at least one product transaction time and the at least one product transaction price for each transaction, to provide at least one location where the product is available, and the price at which the product is sold at that location.

18. The non-transitory storage medium according to claim 17, wherein the location of the user is received by a method selected from the group consisting of received GPS coordinates, location information provided by the user, and any combination of same.

19. The non-transitory storage medium according to claim 17, wherein the transaction rule parameter is selected from the group consisting of a price requirement, a price range requirement, user location information, product identification information, merchant location information, a geographically selected maximum user travel distance, a default user distance, a transaction time deadline, a SKU line item data, and any combination of same.

20. The non-transitory storage medium according to claim 17, wherein the specified method for providing results of the product watch is selected from the group consisting of telephone calls, text messages, instant messages and e-mails, SMS messages, and any combination of same.

21. The non-transitory storage medium according to claim 20, wherein the results of the product watch are pushed out to the user.

22. The non-transitory storage medium according to claim 17, wherein the confidential customer sensitive information that the filter is configured to remove includes a credit card number and an expiration date.

23. The non-transitory storage medium according to claim 17, wherein the identified matches are provided to the user as displayed information selected from the group consisting of a list of merchant names, a list of merchant addresses, a list of merchant telephone numbers, a map indicating the location of merchants, a price at which the product was sold by merchants, and any combination of same.

24. The non-transitory storage medium according to claim 17, wherein the program is further configured to, when executed by the computer system, result in performance of step of the method comprising:
- removing filtered transaction data from the filtered transaction database after the predetermined amount of time to conserve memory in the filtered transaction database.

\* \* \* \* \*